US012753309B2

(12) United States Patent
Zander et al.

(10) Patent No.: US 12,753,309 B2
(45) Date of Patent: Oct. 6, 2026

(54) POLYMER BLENDS OF POLYAMIDE AND ALIPHATIC POLYKETONE

(71) Applicant: Avient Corporation, Avon Lake, OH (US)

(72) Inventors: Zachary Zander, Lake Geneva, WI (US); John Swanson, Lakewood, OH (US)

(73) Assignee: AVIENT CORPORATION, Avon Lake, OH (US)

( * ) Notice: Subject to any disclaimer, the term of this patent is extended or adjusted under 35 U.S.C. 154(b) by 800 days.

(21) Appl. No.: 18/013,304

(22) PCT Filed: Jun. 25, 2021

(86) PCT No.: PCT/US2021/039109
§ 371 (c)(1),
(2) Date: Dec. 28, 2022

(87) PCT Pub. No.: WO2022/005896
PCT Pub. Date: Jan. 6, 2022

(65) Prior Publication Data

US 2023/0242761 A1 Aug. 3, 2023

Related U.S. Application Data

(60) Provisional application No. 63/046,288, filed on Jun. 30, 2020.

(51) Int. Cl.
*C08L 77/10* (2006.01)
*C08K 3/32* (2006.01)

(52) U.S. Cl.
CPC ................ *C08L 77/10* (2013.01); *C08K 3/32* (2013.01); *C08K 2003/325* (2013.01); *C08L 2205/03* (2013.01)

(58) Field of Classification Search
CPC ..... C08K 2003/325; C08K 3/32; C08L 21/00; C08L 2205/03; C08L 51/04; C08L 51/06; C08L 53/025; C08L 73/00; C08L 77/02; C08L 77/10; C08L 9/00; C08L 9/06
See application file for complete search history.

(56) References Cited

U.S. PATENT DOCUMENTS

| | | | |
|---|---|---|---|
| 5,021,496 A | 6/1991 | Machado et al. | |
| 5,066,701 A | 11/1991 | George et al. | |
| 5,077,333 A | 12/1991 | George | |
| 5,115,003 A | 5/1992 | George et al. | |
| 5,141,981 A | 8/1992 | George et al. | |
| 5,175,210 A | 12/1992 | Machado | |
| 6,150,474 A | 11/2000 | Stoeppelmann et al. | |
| 10,882,975 B2 | 1/2021 | Stppelmann | |
| 2008/0021138 A1 | 1/2008 | Ying et al. | |
| 2012/0271001 A1 | 10/2012 | Soo et al. | |
| 2013/0144001 A1* | 6/2013 | Vergelati | C08L 73/00 524/538 |
| 2016/0222209 A1 | 8/2016 | Jin-Kyung et al. | |
| 2017/0158851 A1 | 6/2017 | Choi et al. | |
| 2017/0166743 A1 | 6/2017 | Yoon et al. | |
| 2023/0272208 A1 | 8/2023 | Zander et al. | |

FOREIGN PATENT DOCUMENTS

| | | |
|---|---|---|
| CN | 105722917 A | 6/2016 |
| CN | 106661322 A | 5/2017 |
| CN | 107739501 A | 2/2018 |
| CN | 107903567 A | 4/2018 |
| CN | 108641269 A | 10/2018 |
| CN | 109096731 A | 12/2018 |
| CN | 109749397 A | 5/2019 |
| CN | 110343382 A | 10/2019 |
| CN | 110372988 A | 10/2019 |
| DE | 19918729 A1 | 10/2000 |
| EP | 3168253 A1 | 5/2017 |
| EP | 3187544 A2 | 7/2017 |
| JP | 2001055516 A | 2/2001 |
| JP | 2018196933 A | 12/2018 |
| KR | 1020160056917 A | 5/2016 |
| KR | 1020170083006 A | 7/2017 |
| KR | 1020180068940 A | 6/2018 |
| KR | 20200038373 A | 4/2020 |
| WO | 2021012187 A1 | 1/2021 |
| WO | 2022005896 A1 | 1/2022 |
| WO | 2022047030 A1 | 3/2022 |

OTHER PUBLICATIONS

Office Action from U.S. Appl. No. 18/023,710 dated Jan. 9, 2026, 12 pages.
Office Action from U.S. Appl. No. 18/023,717 dated Jan. 7, 2026, 11 pages.
Poketone, High Performance Thermoplastic Polymer, 2020, pp. 1-84.
Wakker, Value in Use of Carilon Polymers, Shell Research, Aug. 1994, 24 pages.

* cited by examiner

*Primary Examiner* — Ana L. Woodward
(74) *Attorney, Agent, or Firm* — Calfee, Halter & Griswold LLP

(57) ABSTRACT

Embodiments of the present disclosure are directed to polymer blends comprising greater than or equal to 30 wt % and less than or equal to 88.5 wt % of a polyamide; greater than or equal to 4 wt % and less than or equal to 50 wt % of an aliphatic polyketone; and greater than or equal to 7.5 wt % and less than or equal to 20 wt % of a rubber impact modifier.

19 Claims, 2 Drawing Sheets

POLYMER BLENDS OF POLYAMIDE AND ALIPHATIC POLYKETONE

CLAIM OF PRIORITY

This application claims the benefit of U.S. Provisional Patent Application Ser. No. 63/046,288 and filed on Jun. 30, 2020, which is hereby incorporated by reference in its entirety.

TECHNICAL FIELD

Embodiments of the present disclosure are generally related to polymer blends, and are specifically related to polymer blends of polyamide and aliphatic polyketone having improved impact strength.

BACKGROUND

Many industrial applications, such as automotive parts and mechanical parts require resistance to repeated impact stresses and distortion at elevated temperatures in addition to other properties, including, but not limited to, high flexural and tensile strength, stiffness, and chemical resistance. Other applications, such as sporting goods and safety equipment, require similar resistance to repeated impact stresses, but may not require the same resistance to distortion at elevated temperatures. Polyamides are synthetic polymers that are widely used, because they provide flexural and tensile strength as well as stiffness demanded by these applications.

Polyamides may include a rubber impact modifier to increase the impact strength of the polymer blend such that the polymer blend can withstand the repeated impact stresses of demanding industrial applications. However, rubber impact modifiers increase the cost of the polymer blend as rubber impact modifiers generally require prior modification to improve their interfacial compatibility with polyamides. Moreover, increased amounts of rubber impact modifier may result in a decrease of the flexural and tensile strength and stiffness of the polymer blend.

Accordingly, a continual need exists for improved polymer blends that provide the desired property balance of impact performance, flexural strength, tensile strength, stiffness, and heat deflection temperature, while minimizing the amount of rubber impact modifier.

SUMMARY

Embodiments of the present disclosure are directed to ternary polymer blends, which meet this balance of properties while minimizing the amount of rubber impact modifier. However, these ternary polymer blends have surprisingly yielded improved impact resistance, as evidenced by increased Notched Izod Impact strength.

According to one embodiment, a polymer blend is provided. The polymer blend comprises greater than or equal to 30 wt % and less than or equal to 88.5 wt % of a polyamide; greater than or equal to 4 wt % and less than or equal to 50 wt % of an aliphatic polyketone; and greater than or equal to 7.5 wt % and less than or equal to 20 wt % of a rubber impact modifier.

Additional features and advantages of the embodiments described herein will be set forth in the detailed description which follows, and in part will be readily apparent to those skilled in the art from that description or recognized by practicing the embodiments described herein, including the detailed description, which follows and the claims.

DRAWINGS

Figure 1:
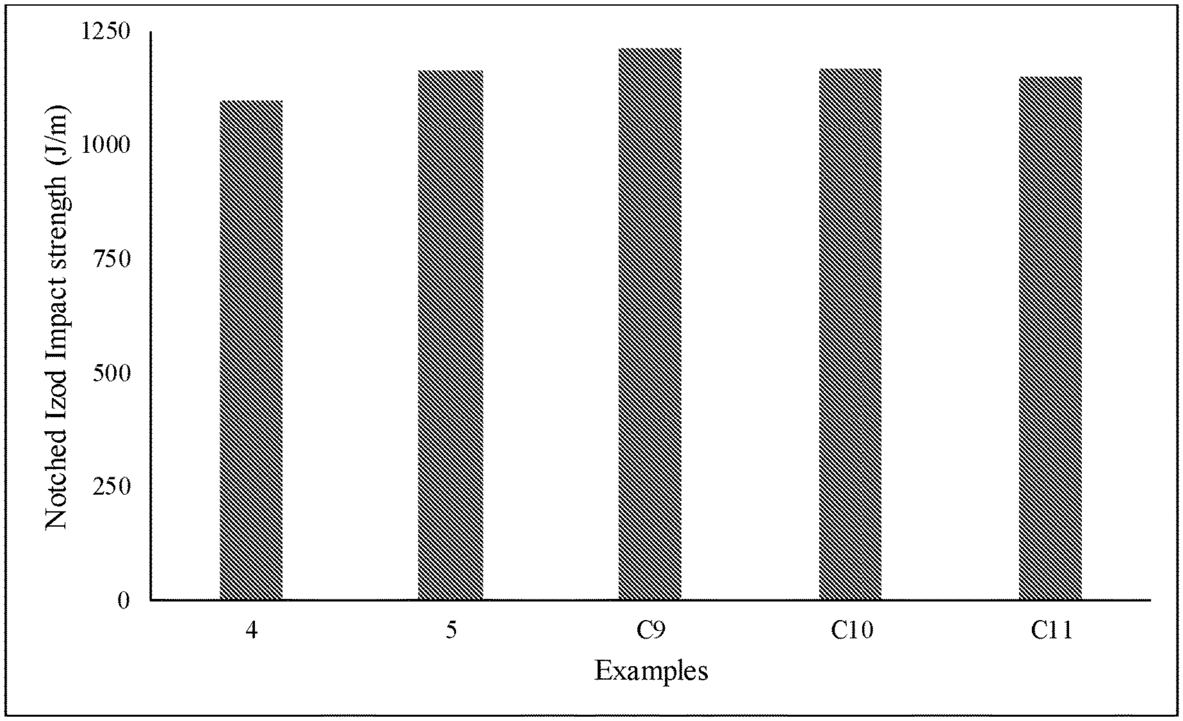
Figure 2:
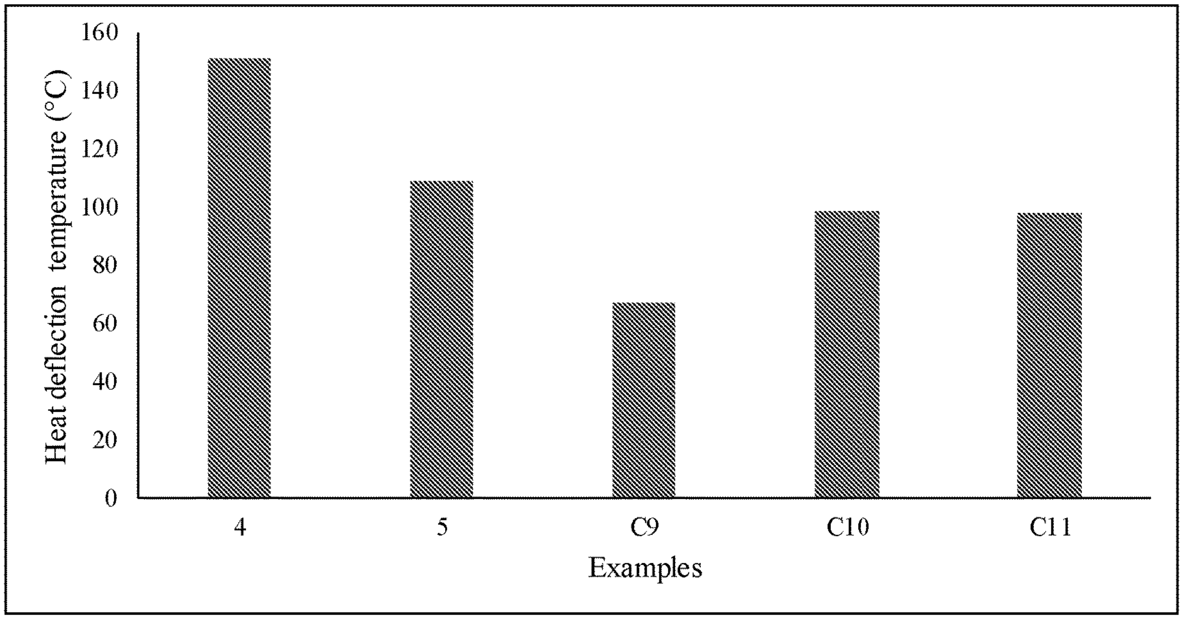

FIG. 1 is a plot showing the Notched Izod Impact strength of Comparative Examples C8-C10 and Examples 4 and 5; and FIG. 2 is a plot showing the heat deflection temperature of Comparative Examples C8-C10 and Examples 4 and 5.

DETAILED DESCRIPTION

Reference will now be made in detail to various embodiments of polymer blends, specifically polymer blends comprising greater than or equal to 30 wt % and less than or equal to 88.5 wt % of a polyamide; greater than or equal to 4 wt % and less than or equal to 50 wt % of an aliphatic polyketone; and greater than or equal to 7.5 wt % and less than or equal to 20 wt % of a rubber impact modifier.

The disclosure should not be construed as limited to the embodiments set forth herein. Rather, these embodiments are provided so that this disclosure will be thorough and complete, and will fully convey the subject matter to those skilled in the art.

Definitions

Unless otherwise defined, all technical and scientific terms used herein have the same meaning as commonly understood by one of ordinary skill in the art. The terminology used in the disclosure herein is for describing particular embodiments only and is not intended to be limiting.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used in the specification and the appended claims, the singular forms "a," "an," and "the" are intended to include the plural forms as well, unless the context clearly indicates otherwise. Thus, for example, reference to "a" component includes aspects having two or more such components, unless the context clearly indicates otherwise.

The terms "0 wt %," "free," and "substantially free," when used to describe the weight and/or absence of a particular component in a polymer blend means that the component is not intentionally added to the polymer blend. However, the polymer blend may contain traces of the component as a contaminant or tramp in amounts less than 0.05 wt %.

Weight Average Molecular Weight (Mw), as described herein, is measured using conventional gel permeation chromatography.

The term "wt %," as described herein, refers to wt % based on the weight of the polymer blend.

The term "Notched Izod Impact strength," as described herein, refers to the kinetic energy needed to initiate fracture and continue the fracture until an article formed from the polymer blend described herein is broken as measured according to ASTM D256 at 23° C. and 2.75 J.

The term "heat deflection temperature," as described herein, refers to the temperature at which an article formed from the polymer blend described herein deflects as measured according to ASTM D648 at 0.45 MPa.

The terms "flexural modulus" or "flexural stiffness," as described herein, refer the ratio of stress to strain in flexural deformation as measured according to ASTM D790 at 23° C. and a rate of strain 0.21 mm/s.

The term "flexural strength," as described herein, refers to the maximum bending stress that may be applied to a material before it yields as measured according to ASTM D790 at 23° C. and a rate of strain 0.21 mm/s.

The terms "tensile modulus" or "tensile stiffness," as described herein, refer to the ratio of the stress along an axis over the strain along that axis as measured according to ASTM D638 at 23° C. and a rate of strain of 0.85 mm/s.

The term "yield," as used herein, refers to the point on a stress-strain curve that indicate s the limit of elastic behavior and the beginning of plastic behavior.

The term "tensile strength at yield," as described herein, refers to the maximum stress that a material can withstand while being stretched before it begins to change shape permanently as measured according to ASTM D638 at 23° C. and a rate of strain of 0.85 mm/s.

The term "tensile elongation at yield," as described herein, refers to the ratio between the increased length and initial length at the yield point as measured according to ASTM D638 at 23° C. and a rate of strain of 0.85 mm/s.

The term "tensile strength at break," as described herein, refers to the maximum stress that a material can withstand while stretching before breaking as measured according to ASTM D638 at 23° C. and a rate of strain of 0.85 mm/s.

The term "tensile elongation at break," as described herein, refers to the ratio between increased length and initial length after breakage as measured according to ASTM D638 at 23° C. and a rate of strain of 0.85 mm/s.

The term "sufficient flexural and tensile strength and stiffness," as described herein, refers to a flexural modulus greater than or equal to 1300 MPa, a flexural strength greater than or equal to 50 MPa, a tensile modulus greater than or equal to 1700 MPa, a tensile strength at yield greater than or equal to 45 MPa, and a tensile strength at break greater than or equal to 45 MPa.

The term "melt flow rate," as described herein, refers to a measure of the ability of the material's melt to flow under pressure as measured according to ASTM D1238 at the given temperature and pressure applied by the given weight.

The term "Mooney viscosity," as described herein, refers to the viscosity reached after a rotor rotates for a given time interval as measured according to ASTM D1646 at 125° C.

The term "specific gravity," as described herein, refers to the ratio of the density of a material to the density of water and is measured according to ASTM D792 at 23° C.

The term "density," as described herein, refers to the mass per unit volume of a substance as measured according to ASTM D792 at 23° C.

As stated above, polyamides, such as Nylon 6 and Nylon 6,6, impart flexural and tensile strength and stiffness to polymer blends. However, rubber impact modifiers are added so the polymer blend may withstand the repeated impact stresses of many industrial applications, such as automotive parts, mechanical parts, sporting goods, and safety equipment. Aliphatic polyketone s generally increase the impact strength and may be added to the polymer blend to reduce the amount of the rubber impact modifier. Nonetheless, adding an aliphatic polyketone to a polymer blend with a polyamide and a rubber impact modifier would be expected to weaken the impact strength of the polymer blend. While not wishing to be bound by theory, it is believed that the reduced impact strength is due to poor interfacial compatibility between the aliphatic polyketone and the rubber impact modifier.

Disclosed herein are polymer blends which mitigate the aforementioned problems. For example, it was surprisingly found that adding relatively small amounts of aliphatic polyketone (e.g., 4 wt %) to a polyamide based polymer blend having reduced amounts of rubber impact modifier (e.g., 7.5 wt %) resulted in polymer blends having high impact performance (i.e., Notched Izod Impact strength greater than or equal to 800 J/m) and high heat deflection temperatures (i.e., greater than or equal to 130° C.). This combination of high impact performance and high heat deflection temperature may be useful in certain industrial applications, such as automotive parts and mechanical parts. For other applications where high heat deflection temperatures are not required, such as sporting goods and safety equipment, the disclosed polyamide polymer blends including small amounts of aliphatic polyketone (e.g., 4 wt %) and reduced amounts of rubber impact modifier (e.g., 7.5 wt %) may have sufficient heat deflection temperatures (i.e., greater than or equal to 100° C.) while still having high impact performance (i.e., Notched Izod Impact strength greater than or equal to 800 J/m). Moreover, polymer blends with lower amounts of rubber impact modifier are advantageous economically and may also preserve the flexural and tensile strength and stiffness that would otherwise decline with increased amounts of rubber impact modifier.

The polymer blends disclosed herein may generally be described as comprising a polyamide, an aliphatic polyketone, and a rubber impact modifier.

Polyamide

As stated above, polyamides impart flexural strength, tensile strength, and stiffness required by demanding industrial applications, such as automotive parts, mechanical parts, sporting goods, and safety equipment.

Various polyamides are considered suitable for the present polymer blends. In embodiments, the polyamide may comprise aliphatic polyamides, such as nylon. In embodiments, the nylon may comprise poly(propiolactam) (Nylon 3), poly(caprolactam) (Nylon 6), polycapryllactam (Nylon 8), poly(decano-10-lactam) (Nylon 10), poly(undecano-11-lactam) (Nylon 11), poly(dodecano-12-lactam) (Nylon 12), poly(tetramethylene adipamide) (Nylon 4,6), poly(hexamathylene adipamide) (Nylon 6,6), poly(hexamethylene azelamide) (Nylon 6,9), poly(hexamethylene sebacamide) (Nylon 6,10), poly(hexamethylene dodecanediamide) (Nylon 6,12), poly(decamethylene sebacamide) (Nylon 10,10), or a combination thereof. In embodiments, in addition to the rubber impact modifier, the polyamide may be toughened with other components of the polymer blend, such as a glass filler.

It may be desirable for the polymer blends disclosed herein to not only achieve high impact performance, but to do so in an environmentally conscious way. Accordingly, in embodiments, the polyamide may comprise a recycled material, such a post-industrial recycled (PIR) polyamide.

The amount of polyamide in the polymer blend may be relatively high (e.g., greater than or equal to 30 wt %) such that the polymer blend has sufficient flexural strength and tensile strength and stiffness to compensate for the addition of rubber impact modifier. In embodiments, the amount of polyamide in the polymer blend may be greater than or equal to 30 wt %, greater than or equal to 40 wt %, greater than or equal to 50 wt %, or even greater than or equal to 55 wt %. In embodiments, the amount of polyamide in the polymer blend may be less than or equal to 88.5 wt %, less than or equal to 87.5 wt %, less than or equal to 80 wt %, less than or equal to 70 wt %, or even less than or equal to 60 wt %. In embodiments, the amount of polyamide in the polymer blend may be greater than or equal to 30 wt % and less than or equal to 88.5 wt %, greater than or equal to 30 wt % and less than or equal to 87.5 wt %, greater than or equal to 30 wt % and less than or equal to 80 wt %, greater than or equal to 30 wt % and less than or equal to 70 wt %, greater than or equal to 30 wt % and less than or equal to 60 wt %, greater than or equal to 40 wt % and less than or equal to 88.5 wt %, greater than or equal to 40 wt % and less than or equal to 87.5 wt %, greater than or equal to 40 wt % and less than or equal to 80 wt %, greater than or equal to 40 wt % and less than or equal to 70 wt %, greater than or equal to 40 wt % and less than or equal to 60 wt %, greater than or equal to 50 wt % and less than or equal to 88.5 wt %, greater than or equal to 50 wt % and less than or equal to 87.5 wt %, greater than or equal to 50 wt % and less than or equal to 80 wt %, greater than or equal to 50 wt % and less than or equal to 70 wt %, greater than or equal to 50 wt % and less than or equal to 60 wt %, greater than or equal to 55 wt % and less than or equal to 88.5 wt %, greater than or equal to 55 wt % and less than or equal to 87.5 wt %, greater than or equal to 55 wt % and less than or equal to 80 wt %, greater than or equal to 55 wt % and less than or equal to 70 wt %, or even greater than or equal to 55 wt % and less than or equal to 60 wt %, or any and all sub-ranges formed from any of these endpoints.

In embodiments, the polyamide may have Notched Izod Impact strength greater than or equal to 25 J/m or even greater than or equal to 30 J/m. In embodiments, the polyamide may have a Notched Izod Impact strength less than or equal to 55 J/m or even less than or equal to 50 J/m. In embodiments, the polyamide may have a Notched Izod Impact strength greater than or equal to 25 J/m and less than or equal to 55 J/m, greater than or equal to 25 J/m and less than or equal to 50 J/m, greater than or equal to 30 J/m and less than or equal to 55 J/m, or even greater than or equal to 30 J/m and less than or equal to 50 J/m, or any and all sub-ranges formed from any of these endpoints.

In embodiments, the polyamide may have a heat deflection temperature greater than or equal to 100° C. or even greater than or equal to 125° C. In embodiments, the polyamide may have a heat deflection temperature less than or equal to 250° C. or even less than or equal to 225° C. In embodiments, the polyamide may have a heat deflection temperature greater than or equal to 100° C. and less than or equal to 250° C., greater than or equal to 100° C. and less than or equal to 225° C., greater than or equal to 125° C. and less than or equal to 250° C., or even greater than or equal to 125° C. and less than or equal to 225° C., or any and all sub-ranges formed from any of these endpoints.

In embodiments, the polyamide may have a flexural modulus greater than or equal to 2000 MPa or even greater than or equal to 2500 MPa. In embodiments, the polyamide may have a flexural modulus less than or equal to 4000 MPa or even less than or equal to 3500 MPa. In embodiments, the polyamide may have a flexural modulus greater than or equal to 2000 MPa and less than or equal to 4000 MPa, greater than or equal to 2000 MPa and less than or equal to 3500 MPa, greater than or equal to 2500 MPa and less than or equal to 4000 MPa, or even greater than or equal to 2500 MPa and less than or equal to 3500 MPa, or any and all sub-ranges formed from any of these endpoints.

In embodiments, the polyamide may have a flexural strength greater than or equal to 80 MPa or even greater than or equal to 100 MPa. In embodiments, the polyamide may have a flexural strength less than or equal to 160 MPa or even less than or equal to 140 MPa. In embodiments, the polyamide may have a flexural strength greater than or equal to 80 MPa and less than or equal to 160 MPa, greater than or equal to 80 MPa and less than or equal to 140 MPa, greater than or equal to 100 MPa and less than or equal to 160 MPa, or even greater than or equal to 100 MPa and less than or equal to 140 MPa, or any and all sub-ranges formed from any of these endpoints.

In embodiments, the polyamide may have a tensile modulus greater than or equal to 1500 MPa or even greater than or equal to 2000 MPa. In embodiments, the polyamide may have a tensile modulus less than or equal to 3000 MPa or even less than or equal to 2500 MPa. In embodiments, the polyamide may have a tensile modulus greater than or equal to 1500 MPa and less than or equal to 3000 MPa, greater than or equal to 1500 MPa and less than or equal to 2500 MPa, greater than or equal to 2000 MPa and less than or equal to 3000 MPa, or even greater than or equal to 2000 MPa and less than or equal to 2500 MPa, or any and all sub-ranges formed from any of these endpoints.

In embodiments, the polyamide may have a tensile strength at yield greater than or equal to 65 MPa or even greater than or equal to 70 MPa. In embodiments, the polyamide may have a tensile strength at yield less than or equal to 85 MPa or even less than or equal to 80 MPa. In embodiments, the polyamide may have a tensile strength at yield greater than or equal to 65 MPa and less than or equal to 85 MPa, greater than or equal to 65 MPa and less than or equal to 80 MPa, greater than or equal to 70 MPa and less than or equal to 85 MPa, or even greater than or equal to 70 MPa and less than or equal to 80 MPa, or any and all sub-ranges formed from any of these endpoints.

In embodiments, the polyamide may have a specific gravity greater than or equal to 1.05 or even greater than or equal to 1.1. In embodiments, the polyamide may have a specific gravity less than or equal to 1.2 or even less than or equal to 1.15. In embodiments, the polyamide may have a specific gravity greater than or equal to 1.05 and less than or equal to 1.2, greater than or equal to 1.05 and less than or equal to 1.15, greater than or equal to 1.1 and less than or equal to 1.2, or even greater than or equal to 1.1 and less than or equal to 1.15, or any and all sub-ranges formed from any of these endpoints.

Suitable commercial embodiments of the polyamide are available under the ALPHALON brand from Grupta Azoty, such as grade 27C; under the ZYTEL brand from Dupont, such as grade 101 NC010; and from Columbia Recycling Corporation, such as grades PI 6 and PI 66. Table 1 shows the respective properties of ALPHALON 27C, ZYTEL 101 NC010, PI 6, and PI 66.

TABLE 1

| | ALPHALON 27C | ZYTEL 101 NC010 | PI 6 | PI 66 |
|---|---|---|---|---|
| Notched Izod Impact strength (J/m) | 45.2 | 40.9 | 37.3-69.4 | 37.3-69.4 |
| Heat deflection temp. (° C.) | 137° C. | 208° C. | — | — |
| Flexural modulus (MPa) | 2612 | 3084 | 2344 | 2565 |
| Flexural strength (MPa) | 110 | 128 | — | — |
| Tensile modulus (MPa) | 2077 | 2235 | — | — |
| Tensile strength at yield (MPa) | 72.6 | 78.6 | 65.5 | 72.4 |
| Tensile elongation at yield (%) | 6 | 6 | — | — |
| Tensile elongation at break (%) | 38 | 19 | — | — |
| Specific gravity | 1.122 | 1.137 | 1.125-1.15 | 1.125-1.15 |

Aliphatic Polyketone

Aliphatic polyketones increase the impact strength of the polymer blend. It was surprisingly found that polyamide polymer blends including relatively small amounts of aliphatic polyketone (e.g., 4 wt %) achieved high impact performance (i.e., Notched Izod Impact strength greater than or equal to 800 J/m) and either a high heat deflection temperature (e.g., greater than or equal to 130° C.) or a sufficient heat deflection temperature (e.g., greater than or equal to 100° C.), even with relatively lower amounts of rubber impact modifier (e.g., 7.5 wt %). While not wishing to be bound by theory, it is believed that this high impact performance is due to either a chemical reaction or a physical interaction between the polyamide and the aliphatic polyketone. With the chemical reaction, the carbonyl groups along the aliphatic polyketone backbone may react with the reactive end chains of the polyamide (e.g., N-terminus of Nylon 6) to form imine and/or pyrrole moieties. This reaction may result in grafting of the polyamide to the aliphatic polyketone, which may result in a compatibilized or stable polymer blend. With the physical interaction, the polyamide and aliphatic polyketone may form a compatible, semi-miscible blend with nanophase separation and hydrogen bonding or another physical interaction is responsible for the changes in impact performance.

Accordingly, in embodiments, the aliphatic polyketone may be included in amounts of at least 4 wt % such that the aliphatic polyketone may react/interact with the polyamide and increase the impact performance of the polymer blend. In other embodiments, the amount of aliphatic polyketone may be limited (e.g., less than or equal to 50 wt %) such that the impact strength is not reduced by the presence of the aliphatic polyketone. In further embodiments, the amount of aliphatic polyketone in the polymer blend may be greater than or equal to 4 wt %, greater than or equal to 4.5 wt %, greater than or equal to 5 wt %, greater than or equal to 5.5 wt %, or even greater than or equal to 6 wt %. In embodiments, the amount of aliphatic polyketone in the polymer blend may be less than or equal to 50 wt %, less than or equal to 35 wt %, less than or equal to 25 wt %, or even less than or equal to 15 wt %. In embodiments, the amount of aliphatic polyketone in the polymer blend may be greater than or equal to 4 wt % and less than or equal to 50 wt %, greater than or equal to 4 wt % and less than or equal to 35 wt %, greater than or equal to 4 wt % and less than or equal to 25 wt %, greater than or equal to 4 wt % and less than or equal to 15 wt %, greater than or equal to 4.5 wt % and less than or equal to 50 wt %, greater than or equal to 4.5 wt % and less than or equal to 35 wt %, greater than or equal to 4.5 wt % and less than or equal to 25 wt %, greater than or equal to 4.5 wt % and less than or equal to 15 wt %, greater than or equal to 5 wt % and less than or equal to 50 wt %, greater than or equal to 5 wt % and less than or equal to 35 wt %, greater than or equal to 5 wt % and less than or equal to 25 wt %, greater than or equal to 5 wt % and less than or equal to 15 wt %, greater than or equal to 5.5 wt % and less than or equal to 50 wt %, greater than or equal to 5.5 wt % and less than or equal to 35 wt %, greater than or equal to 5.5 wt % and less than or equal to 25 wt %, greater than or equal to 5.5 wt % and less than or equal to 15 wt %, greater than or equal to 6 wt % and less than or equal to 50 wt %, greater than or equal to 6 wt % and less than or equal to 35 wt %, greater than or equal to 6 wt % and less than or equal to 25 wt %, or even greater than or equal to 6 wt % and less than or equal to 15 wt %, or any all sub-ranges formed from any of these endpoints.

In embodiments, the aliphatic polyketone may have a Notched Izod Impact strength greater than or equal to 55 J/m, greater than or equal to 75 J/m, or even greater than or equal to 90 J/m. In embodiments, the aliphatic polyketone may have a Notched Izod Impact strength less than or equal to 115 J/m or even less than or equal to 100 J/m. In embodiments, the aliphatic polyketone may have a Notched Izod Impact strength greater than or equal to 55 J/m and less than or equal to 115 J/m, greater than or equal to 55 J/m and less than or equal to 100 J/m, greater than or equal to 75 J/m and less than or equal to 115 J/m, greater than or equal to 75 J/m and less than or equal to 100 J/m, greater than or equal to 90 J/m and less than or equal to 115 J/m, or even greater than or equal to 90 J/m and less than or equal to 100 J/m, or any and all sub-ranges formed from any of these endpoints.

In embodiments, the aliphatic polyketone may have a heat deflection temperature greater than or equal to 180° C. or even greater than or equal to 190° C. In embodiments, the aliphatic polyketone may have a heat deflection temperature less than or equal to 225° C. or even less than or equal to 210° C. In embodiments, the aliphatic polyketone may have a heat deflection temperature greater than or equal to 180° C. and less than or equal to 225° C., greater than or equal to 180° C. and less than or equal to 210° C., greater than or equal to 190° C. and less than or equal to 225° C., or even greater than or equal to 190° C. and less than or equal to 210° C., and any and all sub-ranges formed from any of these endpoints.

In embodiments, the aliphatic polyketone may have a flexural modulus greater than or equal to 1000 MPa or even greater than or equal to 1250 MPa. In embodiments, the aliphatic polyketone may have a flexural modulus less than or equal to 2000 MPa or even less than or equal to 1750 MPa. In embodiments, the aliphatic polyketone may have a flexural modulus greater than or equal to 1000 MPa and less than or equal to 2000 MPa, greater than or equal to 1000 MPa and less than or equal to 1750 MPa, greater than or equal to 1250 MPa and less than or equal to 2000 MPa, or even greater than or equal to 1250 MPa and less than or equal to 1750 MPa, or any and all sub-ranges formed from any of these endpoints.

In embodiments, the aliphatic polyketone may have a flexural strength greater than or equal to 40 MPa or even greater than or equal to 50 MPa. In embodiments, the aliphatic polyketone may have a flexural strength less than or equal to 70 MPa or even less than or equal to 60 MPa. In embodiments, the aliphatic polyketone may have a flexural strength greater than or equal to 40 MPa and less than or equal to 70 MPa, greater than or equal to 40 MPa and less than or equal to 60 MPa, greater than or equal to 50 MPa and less than or equal to 70 MPa, or even greater than or equal to 50 MPa and less than or equal to 60 MPa, or any and all sub-ranges formed from any of these endpoints.

In embodiments, the aliphatic polyketone may have a tensile modulus greater than or equal to 1100 MPa or even greater than or equal to 1350 MPa. In embodiments, the aliphatic polyketone may have a tensile modulus less than or equal to 2100 MPa or even less than or equal to 1850 MPa. In embodiments, the aliphatic polyketone may have a tensile modulus greater than or equal to 1100 MPa and less than or equal to 2100 MPa, greater than or equal to 1100 MPa and less than or equal to 1850 MPa, greater than or equal to 1350 MPa and less than or equal to 2100 MPa, or even greater than or equal to 1350 MPa and less than or equal to 1850 MPa, or any and all sub-ranges formed from any of these endpoints.

In embodiments, the aliphatic polyketone may have a tensile strength at yield greater than or equal to 45 MPa or even greater than or equal to 55 MPa. In embodiments, the aliphatic polyketone may have a tensile strength at yield less than or equal to 75 MPa or even less than or equal to 65 MPa. In embodiments, the aliphatic polyketone may have a tensile strength at yield greater than or equal to 45 MPa and less than or equal to 75 MPa, greater than or equal to 45 MPa and less than or equal to 65 MPa, greater than or equal to 55 MPa and less than or equal to 75 MPa, or even greater than or equal to 55 MPa and less than or equal to 65 MPa, or any and all sub-ranges formed from any of these endpoints.

In embodiments, the aliphatic polyketone may have a melt flow rate greater than or equal to 40 g/10 min or even greater than or equal to 50 g/10 min as measured in accordance with ASTM D1238 at 240° C. and a weight of 2.16 kg. In embodiments, the aliphatic polyketone may have a melt flow rate less than or equal to 210 g/10 min, less than or equal to 200 g/10 min, less than or equal to 150 g/10 min, less than or equal to 100 g/10 min, less than or equal to 80 g/10 min, or even less than or equal to 70 g/10 min as measured in accordance with ASTM D1238 at 240° C. and a weight of 2.16 kg. In embodiments, the aliphatic polyketone may have a melt flow rate greater than or equal to 40 g/10 min and less than or equal to 210 g/10 min, greater than or equal to 40 g/10 min and less than or equal to 200 g/10 min, greater than or equal to 40 g/10 min and less than or equal to 150 g/10 min, greater than or equal to 40 g/10 min and less than or equal to 100 g/10 min, greater than or equal to 40 g/10 min and less than or equal to 80 g/10 min, greater than or equal to 40 g/10 min and less than or equal to 70 g/10 min, greater than or equal to 50 g/10 min and less than or equal to 210 g/10 min, greater than or equal to 50 g/10 min and less than or equal to 200 g/10 min, greater than or equal to 50 g/10 min and less than or equal to 150 g/10 min, greater than or equal to 50 g/10 min and less than or equal to 100 g/10 min, greater than or equal to 50 g/10 min and less than or equal to 80 g/10 min, or even greater than or equal to 50 g/10 min and less than or equal to 70 g/10 min, or any and all sub-ranges formed from any of these endpoints as measured in accordance with ASTM D1238 at 240° C. and a weight of 2.16 kg.

In embodiments, the aliphatic polyketone may have a specific gravity greater than or equal to 1.15 or even greater than or equal to 1.2. In embodiments, the aliphatic polyketone may have a specific gravity less than or equal to 1.3 or even less than or equal to 1.25. In embodiments, the aliphatic polyketone may have a specific gravity greater than or equal to 1.15 and less than or equal to 1.3, greater than or equal to 1.15 and less than or equal to 1.25, greater than or equal to 1.2 and less than or equal to 1.3, or even greater than or equal to 1.2 and less than or equal to 1.25, or any and all sub-ranges formed from any of these endpoints.

Suitable commercial embodiments of the aliphatic polyketone are available under the POKETONE brand from Hyosung, such as grades M330 and M930 containing various additives as denoted by "A," "F," "S," or others, or containing no additives as designated by "P." Table 2 shows certain properties of POKETONE M330A and POKETONE M930A.

TABLE 2

| | POKETONE M330A | POKETONE M930A |
|---|---|---|
| Notched Izod Impact strength (J/m) | 95 | 60 |
| Heat deflection temp (° C.) | 200 | 200 |
| Flexural modulus (MPa) | 1500 | 1550 |
| Flexural strength (MPa) | 57 | 60 |
| Tensile modulus (MPa) | 1600 | 1650 |
| Tensile strength at yield (MPa) | 60 | 62 |
| Tensile elongation at yield (%) | 21 | 20 |
| Tensile elongation at break (%) | 300 | 150 |
| Melt flow rate (g/10 min) (240° C./2.16 kg) | 60 | 200 |
| Specific gravity | 1.24 | 1.24 |

Rubber Impact Modifier

As described hereinabove, a rubber impact modifier is added to a polymer blend to increase the impact strength of the polyamide. However, rubber impact modifiers increase the cost of manufacturing the polymer blend and decrease the flexural and tensile strength and stiffness of the polymer blend. Accordingly, it is desirable to reduce the amount of rubber impact modifier present in the polymer blend to the extent possible without heavily sacrificing the requisite impact performance imparted by the rubber impact modifier. In embodiments, the amount of rubber impact modifier in the polymer blend may be greater than or equal to 7.5 wt %, greater than or equal to 8.5 wt %, or even greater than or equal to 10 wt %. In embodiments, the amount of rubber impact modifier in the polymer blend may be less than or equal to 20 wt % or even less than or equal to 15 wt %. In embodiments, the amount of rubber impact modifier in the polymer blend may be greater than or equal to 7.5 wt % and less than or equal to 20 wt %, greater than or equal to 7.5 wt % and less than or equal to 15 wt %, greater than or equal to 8.5 wt % and less than or equal to 20 wt %, greater than or equal to 8.5 wt % and less than or equal to 15 wt %, greater than or equal to 10 wt % and less than or equal to 20 wt %, or even greater than or equal to 10 wt % and less than or equal to 15 wt %, or any and all sub-ranges formed from any of these endpoints.

In embodiments, the rubber impact modifier may comprise a styrene-ethylene/butylene-styrene block copolymer (SEBS), a styrene isoprene block copolymer (SIS), an ethylene propylene diene monomer (EPDM), anhydride grafted analogues thereof, or a combination thereof. In embodiments, grafted maleic anhydrides may help compatibilize the components of the polymer blend. The grafted maleic anhydride may react with or be miscible with the polyamide and/or aliphatic polyketone to alter the dissimilar phases and improve the impact strength of the polymer blend. In embodiments, the rubber impact modifier comprises maleic anhydride grafted SEBS, maleic anhydride grafted EPDM, or a combination thereof.

In embodiments, the rubber impact modifier may have an amount of bound maleic anhydride greater than or equal to 0.4 wt % or even greater than or equal to 0.6 wt %. In embodiments, the rubber impact modifier may have an amount of bound maleic anhydride less than or equal to 3 wt % or even less than or equal to 2 wt %. In embodiments, the rubber impact modifier may have an amount of bound maleic anhydride greater than or equal to 0.4 wt % and less than or equal to 3 wt %, greater than or equal to 0.4 wt % and less than or equal to 2 wt %, greater than or equal to 0.6 wt % and less than or equal to 3 wt %, or even greater than or equal to 0.6 wt % and less than or equal to 2 wt %, or any and all sub-ranges formed from any of these endpoints.

In embodiments, the rubber impact modifier may have a melt flow rate greater than or equal to 10 g/10 min or even greater than or equal to 15 g/10 min as measured in accordance with ASTM D1238 at 230° C. and a weight of 5.0 kg. In embodiments, the rubber impact modifier may have a melt flow rate less than or equal to 30 g/10 min or even less than or equal to 25 g/10 min as measured in accordance with ASTM D1238 at 230° C. and a weight of 5.0 kg. In embodiments, the rubber impact modifier may have a melt flow rate greater than or equal to 10 g/10 min and less than or equal to 30 g/10 min, greater than or equal to 10 g/10 min and less than or equal to 25 g/10 min, greater than or equal to 15 g/10 min and less than or equal to 30 g/10 min, or even greater than or equal to 15 g/10 min and less than or equal to 25 g/10 min, or any and all sub-ranges formed from any of these endpoints as measured in accordance with ASTM D1238 at 230° C. and a weight of 5.0 kg.

In embodiments, the rubber impact modifier may have a specific gravity greater than or equal to 0.8 or even greater than or equal to 0.9. In embodiments, the rubber impact modifier may have a specific gravity less than or equal to 1.1 or even less than or equal to 1. In embodiments, the rubber impact modifier may have a specific gravity greater than or equal to 0.8 and less than or equal to 1.1, greater than or equal to 0.8 and less than or equal to 1, greater than or equal to 0.9 and less than or equal to 1.1, or even greater than or equal to 0.9 and less than or equal to 1.

In embodiments, the rubber impact modifier may have a Mooney viscosity greater than or equal to 20 or even greater than or equal to 25. In embodiments, the rubber impact modifier may have a Mooney viscosity less than or equal to 40 or even less than or equal to 35. In embodiments, the rubber impact modifier may have a Mooney viscosity greater than or equal to 20 and less than or equal to 40, greater than or equal to 20 and less than or equal to 35, greater than or equal to 25 and less than or equal to 40, or even greater than or equal to 25 and less than or equal to 35, or any and all sub-ranges formed from any of these endpoints.

Suitable commercial embodiments of the rubber impact modifier are available under the ROYALTUF brand from SI group, such as grade 485, and under the KRATON brand from Kraton Polymers, such as grade FG1901X. Table 3 shows certain properties of ROYALTUF 485 and KRATON FG1901X.

TABLE 3

| | ROYALTUF 485 | KRATON FG1901X |
|---|---|---|
| Structure | maleic anhydride grafted EPDM | Maleic anhydride grafted styrene-ethylene/butylene-styrene block copolymer (SEBS) |
| Bound maleic anhydride (wt %) | 0.4-0.6 | 1.4 to 2.0 |
| Melt flow rate (g/10 min) (230° C./5.0 kg) | — | 22 |
| Specific gravity | — | 0.91 |
| Density (g/cm$^3$) | 0.87 | — |
| Mooney Viscosity (1 + 4) | 30 | — |

Polymer Blend

With polyamide and aliphatic polyketone blends, high Notched Impact strength coincides with low heat deflection temperatures. An exception to this general trend was surprisingly found, where polymer blends including a relatively low amount of aliphatic polyketone and a relatively high amount of polyamide have sufficient heat deflection temperatures (e.g., greater than or equal to 100° C.) or high heat deflection temperatures (e.g., greater than or equal to 130° C.) and still achieve a high Notched Izod Impact strength greater than or equal to 800 J/m. In embodiments, the ratio by weight of the polyamide to the aliphatic polyketone may be from 1:1 to 19:1, from 3:1 to 19:1, from 5:1 to 19:1, from 10:1 to 17:1, from 15:1 to 19:1, or even from 17:1 to 19:1 or any and all sub-ranges formed from any of these endpoints.

A higher Notched Izod Impact strength for a polymer blend indicates an increase in impact strength. As described hereinabove, it was surprisingly found that adding a relatively small amount of aliphatic polyketone to the polymer blend causes an increase in Notched Izod Impact strength, even with relatively low amounts of rubber impact modifier. In embodiments, the polymer blend may have a Notched Izod Impact strength greater than or equal to 800 J/m, greater than or equal to 900 J/m, greater than or equal to 1000 J/m, greater than or equal to 1050 J/m, or even greater than or equal to 1100 J/m. In embodiments, the polymer blend may have a Notched Izod Impact strength less than or equal to 1600 J/m, less than or equal to 1500 J/m, or even less than or equal to 1400 J/m. In embodiments, the polymer blend may have a Notched Izod Impact strength greater than or equal to 800 J/m and less than or equal to 1600 J/m, greater than or equal to 800 J/m and less than or equal to 1500 J/m, greater than or equal to 800 J/m and less than or equal to 1400 J/m, greater than or equal to 900 J/m and less than or equal to 1600 J/m, greater than or equal to 900 J/m and less than or equal to 1500 J/m, greater than or equal to 900 J/m and less than or equal to 1400 J/m, greater than or equal to 1000 J/m and less than or equal to 1600 J/m, greater than or equal to 1000 J/m and less than or equal to 1500 J/m, greater than or equal to 1000 J/m and less than or equal to 1400 J/m, greater than or equal to 1050 J/m and less than or equal to 1600 J/m, greater than or equal to 1050 J/m and less than or equal to 1500 J/m, greater than or equal to 1050 J/m and less than or equal to 1400 J/m, greater than or equal to 1100 J/m and less than or equal to 1600 J/m, greater than or equal to 1100 J/m and less than or equal to 1500 J/m, or even greater than or equal to 1100 J/m and less than or equal to 1400 J/m, or any and all sub-ranges formed from any of these endpoints.

While not wishing to be bound by theory, it is believed that the high heat deflection temperature (e.g., greater than or equal to 130° C.) achieved by the polymer blends disclosed herein is due to the reduced amounts of rubber impact modifier. A higher heat deflection temperature indicates an increase in the polymer blend's ability to resist distortion under a given load at an elevated temperature. As discussed hereinabove, certain applications may require high heat deflection temperatures (e.g., greater than or equal to 130° C.) and in other applications, heat deflection temperatures greater than or equal to 100° C. may be sufficient. The polymer blends disclosed herein have high impact performance (i.e., Notched Izod Impact strength greater than or equal to 800 J/m) and may meet the requirements of both high heat deflection temperature applications and sufficient heat deflection temperature applications. In embodiments, the polymer blend may have a heat deflection temperature greater than or equal to 100° C., greater than or equal to 115° C., greater than or equal to 130° C., greater than or equal to 140° C., greater than or equal to 145° C., or even greater than or equal to 150° C. In embodiments, the polymer blend may have a heat deflection temperature less than or equal to 180° C., less than or equal to 170° C., or even less than or equal to 160° C. In embodiments, the polymer blend may have a heat deflection temperature greater than or equal 100° C. and less than or equal to 180° C., greater than or equal to 100° C. and less than or equal to 170° C., greater than or equal to 100° C. and less than or equal to 160° C., greater than or equal 115° C. and less than or equal to 180° C., greater than or equal to 115° C. and less than or equal to 170° C., greater than or equal to 115° C. and less than or equal to 160° C., greater than or equal 130° C. and less than or equal to 180° C., greater than or equal to 130° C. and less than or equal to 170° C., greater than or equal to 130° C. and less than or equal to 160° C., greater than or equal 140° C. and less than or equal to 180° C., greater than or equal to 140° C. and less than or equal to 170° C., greater than or equal to 140° C. and less than or equal to 160° C., greater than or equal 145° C. and less than or equal to 180° C., greater than or equal to 145° C. and less than or equal to 170° C., greater than or equal to 145° C. and less than or equal to 160° C., greater than or equal 150° C. and less than or equal to 180° C., greater than or equal to 150° C. and less than or equal to 170° C., or even greater than or equal to 150° C. and less than or equal to 160° C., or any and all sub-ranges formed from any of these endpoints.

Polyamides increase and rubber impact modifiers decrease the flexural and tensile strength and stiffness of the polymer blend. Accordingly, the polymer blends described herein include a relatively high amount of polyamide and a relatively low amount of rubber impact modifier such that the polymer blend has sufficient flexural and tensile strength and stiffness. Flexural modulus and flexural strength are measurements of a material's flexibility. A higher flexural modulus and higher flexural strength indicate the increased ability of the polymer blend to resist bending or deformation. In embodiments, the polymer blend may have a flexural modulus greater than or equal to 1300 MPa, greater than or equal to 1400 MPa, or even greater than or equal to 1500 MPa. In embodiments, the polymer blend may have a flexural modulus less than or equal to 2700 MPa, less than or equal to 2600 MPa, or even less than or equal to 2500 MPa. In embodiments, the polymer blend may have a flexural modulus greater than or equal to 1300 MPa and less than or equal to 2700 MPa, greater than or equal to 1300 MPa and less than or equal to 2600 MPa, greater than or equal to 1300 MPa and less than or equal to 2500 MPa, greater than or equal to 1400 MPa and less than or equal to 2700 MPa, greater than or equal to 1400 MPa and less than or equal to 2600 MPa, greater than or equal to 1400 MPa and less than or equal to 2500 MPa, greater than or equal to 1500 MPa and less than or equal to 2700 MPa, greater than or equal to 1500 MPa and less than or equal to 2600 MPa, or even greater than or equal to 1500 MPa and less than or equal to 2500 MPa, or any and all sub-ranges formed from any of these endpoints.

In embodiments, the polymer blend may have a flexural strength greater than or equal to 50 MPa, greater than or equal to 60 MPa, or even greater than or equal to 65 MPa. In embodiments, the polymer blend may have a flexural strength less than or equal to 120 MPa, less than or equal to 100 MPa, or even less than or equal to 90 MPa. In embodiments, the polymer blend may have a flexural strength greater than or equal to 50 MPa and less than or equal to 120 MPa, greater than or equal to 50 MPa and less than or equal to 100 MPa, greater than or equal to 50 MPa and less than or equal to 90 MPa, greater than or equal to 60 MPa and less than or equal to 120 MPa, greater than or equal to 60 MPa and less than or equal to 100 MPa, greater than or equal to 60 MPa and less than or equal to 90 MPa, greater than or equal to 65 MPa and less than or equal to 120 MPa, greater than or equal to 65 MPa and less than or equal to 100 MPa, or even greater than or equal to 65 MPa and less than or equal to 90 MPa, or any and all sub-ranges formed from any of these endpoints.

Tensile modulus and tensile strength are measurements of the polymer blend's stiffness. A higher tensile modulus and tensile strength indicate an increased stiffness and, thus, correlates to a stronger polymer blend. In embodiments, the polymer blend may have a tensile modulus greater than or equal to 1700 MPa, greater than or equal to 1800 MPa, or even greater than or equal to 1900 MPa. In embodiments, the polymer blend may have a tensile modulus less than or equal to 2500 MPa, less than or equal to 2400 MPa, or even less than or equal to 2300 MPa. In embodiments, the polymer blend may have a tensile modulus greater than or equal to 1700 MPa and less than or equal to 2500 MPa, greater than or equal to 1700 MPa and less than or equal to 2400 MPa, greater than or equal to 1700 MPa and less than or equal to 2300 MPa, greater than or equal to 1800 MPa and less than or equal to 2500 MPa, greater than or equal to 1800 MPa and less than or equal to 2400 MPa, greater than or equal to 1800 MPa and less than or equal to 2300 MPa, greater than or equal to 1900 MPa and less than or equal to 2500 MPa, greater than or equal to 1900 MPa and less than or equal to 2400 MPa, or even greater than or equal to 1900 MPa and less than or equal to 2300 MPa, or any and all sub-ranges formed from any of these endpoints.

In embodiments, the polymer blend may have a tensile strength at yield greater than or equal to 45 MPa, greater than or equal to 50 MPa, greater than or equal to 55 MPa, or even greater than or equal to 60 MPa. In embodiments, the polymer blend may have a tensile strength at yield less than or equal to 90 MPa, less than or equal to 80 MPa, or even less than or equal to 70 MPa. In embodiments, the polymer blend may have a tensile strength at yield greater than or equal to 45 MPa and less than or equal to 90 MPa, greater than or equal to 45 MPa and less than or equal to 80 MPa, greater than or equal to 45 MPa and less than or equal to 70 MPa, greater than or equal to 50 MPa and less than or equal to 90 MPa, greater than or equal to 50 MPa and less than or equal to 80 MPa, greater than or equal to 50 MPa and less than or equal to 70 MPa, greater than or equal to 55 MPa and less than or equal to 90 MPa, greater than or equal to 55 MPa and less than or equal to 80 MPa, greater than or equal to 55 MPa and less than or equal to 70 MPa, greater than or equal to 60 MPa and less than or equal to 90 MPa, greater than or equal to 60 MPa and less than or equal to 80 MPa, or even greater than or equal to 60 MPa and less than or equal to 70 MPa, or any and all sub-ranges formed from any of these endpoints.

In embodiments, the polymer blend may have a tensile elongation at yield greater than or equal to 90%, greater than or equal to 100%, or even greater than or equal to 110%. In embodiments, the polymer blend may have a tensile elongation at yield less than or equal to 210%, less than or equal to 200%, or even less than or equal to 190%. In embodiments, the polymer blend may have a tensile elongation at yield greater than or equal to 90% and less than or equal to 210%, greater than or equal to 90% and less than or equal to 200%, greater than or equal to 90% and less than or equal to 190%, greater than or equal to 100% and less than or equal to 210%, greater than or equal to 100% and less than or equal to 200%, greater than or equal to 100% and less than or equal to 190%, greater than or equal to 110% and less than or equal to 210%, greater than or equal to 110% and less than or equal to 200%, or even greater than or equal to 110% and less than or equal to 190%, or any and all sub-ranges formed from any of these endpoints.

In embodiments, the polymer blend may have a tensile strength at break greater than or equal to 45 MPa, greater than or equal to 50 MPa, greater than or equal to 55 MPa, or even greater than or equal to 60 MPa. In embodiments, the polymer blend may have a tensile strength at break less than or equal to 90 MPa, less than or equal to 80 MPa, or even less than or equal to 70 MPa. In embodiments, the polymer blend may have a tensile strength at break greater than or equal to 45 MPa and less than or equal to 90 MPa, greater than or equal to 45 MPa and less than or equal to 80 MPa, greater than or equal to 45 MPa and less than or equal to 70 MPa, greater than or equal to 50 MPa and less than or equal to 90 MPa, greater than or equal to 50 MPa and less than or equal to 80 MPa, greater than or equal to 50 MPa and less than or equal to 70 MPa, greater than or equal to 55 MPa and less than or equal to 90 MPa, greater than or equal to 55 MPa and less than or equal to 80 MPa, greater than or equal to 55 MPa and less than or equal to 70 MPa, greater than or equal to 60 MPa and less than or equal to 90 MPa, greater than or equal to 60 MPa and less than or equal to 80 MPa, or even greater than or equal to 60 MPa and less than or equal to 70 MPa, or any and all sub-ranges formed from any of these endpoints.

In embodiments, the polymer blend may have a tensile elongation at break greater than or equal 50%, greater than or equal to 75%, greater than or equal to 100%, or even greater than or equal to 125%. In embodiments, the polymer blend may have a tensile elongation at break less than or equal to 200%, less than or equal to 190%, or even less than or equal to 180%. In embodiments, the polymer blend may have a tensile elongation at break greater than or equal to 50% and less than or equal to 200%, greater than or equal to 50% and less than or equal to 190%, greater than or equal to 50% and less than or equal to 180%, greater than or equal to 75% and less than or equal to 200%, greater than or equal to 75% and less than or equal to 190%, greater than or equal to 75% and less than or equal to 180%, greater than or equal to 100% and less than or equal to 200%, greater than or equal to 100% and less than or equal to 190%, greater than or equal to 100% and less than or equal to 180%, greater than or equal to 125% and less than or equal to 200%, greater than or equal to 125% and less than or equal to 190%, or even greater than or equal to 125% and less than or equal to 180%, or any and all sub-ranges formed from any of these endpoints.

In embodiments, the polymer blend may have a melt flow rate greater than or equal to 0.5 g/10 min or even greater than or equal to 1 g/10 min as measured in accordance with ASTM D1238 at 250° C. and a weight of 5 kg. In embodiments, the polymer blend may have a melt flow rate less than or equal to 20 g/10 min, less than or equal to 10 g/10 min, less than or equal to 5 g/10 min, or even less than or equal to 2 g/10 min as measured in accordance with ASTM D1238 at 250° C. and a weight of 5 kg. In embodiments, the polymer blend may have a melt flow rate greater than or equal to 0.5 g/10 min and less than or equal to 20 g/10 min, greater than or equal to 0.5 g/10 min and less than or equal to 10 g/10 min, greater than or equal to 0.5 g/10 min and less than or equal to 5 g/10 min, greater than or equal to 0.5 g/10 min and less than or equal to 2 g/10 min, greater than or equal to 1 g/10 min and less than or equal to 20 g/10 min, greater than or equal to 1 g/10 min and less than or equal to 10 g/10 min, greater than or equal to 1 g/10 min and less than or equal to 5 g/10 min, greater than or equal to 1 g/10 min and less than or equal to 2 g/10 min, or any and all sub-ranges formed from any of these endpoints as measured in accordance with ASTM D1238 at 250° C. and a weight of 5 kg.

In embodiments, the polymer blend may have a specific gravity greater than or equal to 1.05 or even greater than or equal to 1.1. In embodiments, the polymer blend may have a specific gravity less than or equal to 1.2 or even less than or equal to 1.15. In embodiments, the polymer blend may have a specific gravity greater than or equal to 1.05 and less than or equal to 1.2, greater than or equal to 1.05 and less than or equal to 1.15, greater than or equal to 1.1 and less than or equal to 1.2, or even greater than or equal to 1.1 and less than or equal to 1.15, or any and all sub-ranges formed from any of these endpoints.

Hydroxyapatite Stabiliser

In embodiments, the polymer blend may further comprise a hydroxyapatite stabilizer. While not wishing to be bound by theory, without a hydroxyapatite stabilizer present, the aliphatic polyketone may crosslink with itself and not react/interact with the polyamide. When present in the polymer blend, the hydroxyapatite stabilizer acts as an acid scavenger, which prevents the aliphatic polyketone from self-reaction and crosslinking.

In embodiments, the hydroxyapatite stabilizer may comprise pentacalcium hydroxide tris(orthophosphate), amorphous tricalcium hydroxyphosphate, calcium phosphate hydroxide, or a combination thereof.

In embodiments, the amount of hydroxyapatite stabilizer in the polymer blend may be greater than 0 wt %, greater than or equal to 0.1 wt %, greater than or equal to 0.25 wt %, or even greater than or equal to 0.5 wt %. In embodiments, the amount of hydroxyapatite stabilizer in the polymer blend may be less than or equal to 1 wt % or even less than or equal to 0.75 wt %. In embodiments, the amount of hydroxyapatite stabilizer in the polymer blend may be greater than 0 wt % and less than or equal to 1 wt %, greater than 0 wt % and less than or equal to 0.75 wt %, greater than or equal to 0.1 wt % and less than or equal to 1 wt %, greater than or equal to 0.1 wt % and less than or equal to 0.75 wt %, greater than or equal to 0.25 wt % and less than or equal to 1 wt %, greater than or equal to 0.25 wt % and less than or equal to 0.75 wt %, greater than or equal to 0.5 wt % and less than or equal to 1 wt %, or even greater than or equal to 0.5 wt % and less than or equal to 0.75 wt %, or any and all sub-ranges formed from any of these endpoints.

Suitable commercial embodiments of the hydroxyapatite stabilizer are available under the as EP SOLUTE brand from Budenheim, such as grade C13-09.

Filler

In embodiments, the polymer blend may further comprise a filler. In embodiments, the filler may comprise adhesion promoters; biocides; anti-fogging agents; anti-static agents; blowing and foaming agents; bonding agents and bonding polymers; dispersants; flame retardants and smoke suppressants; initiators; lubricants; micas; pigments, colorants, and dyes; processing aids; release agents; silanes, titanates, and zirconates; slip and anti-blocking agents; stearates; ultraviolet light absorbers; viscosity regulators; waxes; or combinations thereof.

In embodiments, the amount of filler in the polymer blend may be greater than 0 wt % or even greater than or equal to 0.1 wt %. In embodiments, the amount of the filler in the polymer blend may be less than or equal to 1 wt %, less than or equal to 0.75 wt %, or even less than or equal to 0.5 wt %. In embodiments, the amount of the filler in the polymer blend may be greater than 0 wt % and less than or equal to 1 wt %, greater than 0 wt % and less than or equal to 0.75 wt %, greater than 0 wt % and less than or equal to 0.5 wt %, greater than or equal to 0.1 wt % and less than or equal to 1 wt %, greater than or equal to 0.1 wt % and less than or equal to 0.75 wt %, or even greater than or equal to 0.1 wt % and less than or equal to 0.5 wt %, or any and all sub-ranges formed from any of these endpoints.

Suitable commercial embodiments of the filler are available under the IRGAFOS 168 brand from BASF, such as grade 168; under the IRGANOX brand from BASF, such as grades 1098 and 1010; under the HOSTANOX brand from Clariant, such as grade P-EPQ; and under the CYASORB® brand from Solvay, such as grade UV-1164.

Processing

In embodiments, the polymer blend described herein may be made with batch process or continuous process.

In embodiments, the components of the polymer blend may be added all together in an extruder and mixed. In embodiments, mixing may be a continuous process at an elevated temperature (e.g., 240° C.-275° C.) that is sufficient to melt the polymer matrix. In embodiments, fillers may be added at the feed-throat, or by injection or side-feeders downstream. In embodiments, the output from the extruder is pelletized for later extrusion, molding, thermoforming, foaming, calendaring, and/or other processing into polymeric articles.

EXAMPLES

Table 3 shows sources of ingredients for the polymer blends of Comparative Examples C1-C15 and Examples 1-7.

TABLE 3

| Ingredient | Brand | Source |
|---|---|---|
| polyamide (Nylon 6) | ALPHALON 27C | Grupta Azoty |
| aliphatic polyketone | POKETONE ™ M330A | Hyosung Polyketone |

TABLE 3-continued

| Ingredient | Brand | Source |
|---|---|---|
| rubber impact modifier (maleic anhydride grafted EPDM) | ROYALTUF 485 | SI Group |
| rubber impact modifier (maleic anhydride grafted styrene-ethylene/butylene-styrene block copolymer (SEBS)) | KRATON FG 1901X | Kraton Polymers |
| hydroxy apatite stabilizer (tricalcium phosphate) | EPSOLUTE C13-09 | Budenheim |
| antioxidant | IRGAFOS 168 | BASF |
| antioxidant | IRGANOX 1098 | BASF |
| antioxidant | IRGANOX 1010 | BASF |
| antioxidant | HOSTANOX P-EPQ | Clariant |
| UV stabilizer | CYASORB UV-1164 | Solvay |

Table 4 shows the formulations (in wt %) and certain properties of Comparative Example C1 and Examples 1 and 2. Comparative Example C1 and Examples 1 and 2 include different ratios of ALPHALON 27C to POKETONE M330A, ranging from 1:0 in Comparative Example C1 to 1:1 in Example 2.

TABLE 4

| Example | C1 | 1 | 2 |
|---|---|---|---|
| Ratio of ALPHALON 27C to POKETONE M330A | 1:0 | 19:1 | 1:1 |
| ALPHALON 27C | 89.1 | 84.645 | 44.55 |
| POKETONE M330A | 0 | 4.455 | 44.55 |
| ROYALTUF 485 | 10 | 10 | 10 |
| IRGANOX 1010 | 0.4 | 0.4 | 0.4 |
| HOSTANOX P-EPQ | 0.2 | 0.2 | 0.2 |
| CYASORB UV-1164 | 0.3 | 0.3 | 0.3 |
| Notched Izod Impact strength (J/m) | 200 | 877 | 874 |
| Type of notched Izod break | complete | partial | complete |
| Heat deflection temp. (° C.) | 146 | 131 | 115 |
| Flexural modulus (MPa) | 2191 | 2499 | 1986 |
| Flexural strength (MPa) | 89 | 92 | 76 |
| Tensile strength at yield (MPa) | 58 | 64 | 69 |
| Tensile elongation at yield (%) | 5 | 106 | 209 |
| Tensile strength at break (MPa) | 38 | 61 | 67 |
| Tensile elongation at break (%) | 20 | 107 | 216 |
| Specific gravity | 1.10 | 1.10 | 1.15 |

As shown in Table 4, Example 2, a 1:1 ALPHALON 27C to POKETONE M330A polymer blend, has a similar Notched Izod Impact strength as the 19:1 polymer blend of Example 1. While not wishing to be bound by theory, the similar Notched Izod Impact strength between examples having different ALPHALON 27C to POKETONE M330A ratios suggests that the aliphatic polyketone is not properly stabilized and cross-linked with itself. Accordingly, further experiments (i.e., Comparative Examples C2-C15 and Examples 3-6) include a hydroxyapatite stabiliser (i.e., EP SOLUTE C13-09) that stabilizes the blend and prevents aliphatic polyketone self-crosslinking.

Table 5 shows the formulations (in wt %) and certain properties of Comparative Examples C2-C8 and Example 3. Comparative Examples C2-C8 and Example 3 include different ratios of ALPHALON 27C to POKETONE M330A with different amounts of ROYALTUF 485. Comparative Examples C2-C4 include 0 wt % ROYALTUF 485. Comparative Example C5 includes 5 wt % ROYALTUF 485. Comparative Example C6 and Example 3 include 15 wt % ROYALTUF 485. Comparative Examples C7 and C8 include 20 wt % ROYALTUF 485.

TABLE 5

| Example | C2 | C3 | C4 | C5 | C6 | 3 | C7 | C8 |
|---|---|---|---|---|---|---|---|---|
| Ratio of ALPHALON 27C to POKETONE M330A | 0:1 | 1:1 | 1:0 | 3:1 | 1:3 | 3:1 | 1:0 | 1:0 |
| ALPHALON 27C | 0 | 49.55 | 99.1 | 71.825 | 22.275 | 61.825 | 79.1 | 79.1 |
| POKETONE M330A | 99.1 | 49.55 | 0 | 22.275 | 61.825 | 22.275 | 0 | 0 |
| ROYALTUF 485 | 0 | 0 | 0 | 5 | 15 | 15 | 20 | 20 |
| EPSOLUTE C13-09 | 0.5 | 0.5 | 0.25 | 0.25 | 0.25 | 0.5 | 0.5 | 0.25 |
| IRGAFOS 168 | 0.15 | 0.15 | 0.5 | 0.5 | 0.5 | 0.15 | 0.15 | 0.5 |
| IRGANOX 1098 | 0.25 | 0.25 | 0.15 | 0.15 | 0.15 | 0.25 | 0.25 | 0.15 |
| Notched Izod Impact strength (J/m) | 90 | 199 | 79 | 230 | 180 | 1259 | 706 | 744 |
| Type of notched break | complete | complete | complete | complete | complete | partial | partial | Complete |
| Heat deflection temp. (° C.) | 182 | 166 | 129 | 127 | 166 | 107 | 160 | 133 |
| Flexural modulus (MPa) | 1529 | 1623 | 2161 | 1940 | 1204 | 1696 | 1639 | 1667 |
| Flexural strength (MPa) | 103 | 107 | 134 | 120 | 92 | 111 | 110 | 111 |
| Tensile modulus (MPa) | 1584 | 1923 | 2479 | 2178 | 1480 | 1796 | 1922 | 1886 |
| Tensile strength at yield (MPa) | 56 | 58 | 65 | 55 | 44 | 49 | 44 | 43 |
| Tensile elongation at yield (%) | 16 | 20 | 4.2 | 22 | 20 | 33 | 7.5 | 4.9 |
| Tensile strength at break (MPa) | 21 | 79 | 27 | 68 | 38 | 59 | 34 | 33 |
| Tensile elongation at break (%) | 159 | 269 | 38 | 181 | 74 | 133 | 60 | 28 |
| Melt flow rate (g/10 min) (250° C./5 kg) | 150 | 19 | 65 | 1 | 51 | 1 | 32 | 24 |
| Specific gravity | 1.24 | 1.19 | 1.13 | 1.14 | 1.17 | 1.12 | 1.08 | 1.11 |

As shown in Table 5, Comparative Examples C2-C4, polymer blends including 0 wt % ROYALTUF 485, have a poor Notched Izod Impact strength of less than or equal to 230 J/m. As indicated by the examples shown in Table 5, the poor Notched Izod Impact strength is due to the absence or low amount of rubber impact modifier.

Examples that include higher amounts of ALPHALON 27C have increased flexural modulus, flexural strength, tensile modulus, tensile strength at yield, and tensile strength at break when compared to examples that include higher amounts POKETONE M330A. For example, Example 3, a 3:1 ALPHALON 27C to POKETONE M330A polymer blend including 15 wt % ROYALTUF 485, has higher flexural modulus, flexural strength, tensile modulus, tensile strength at yield, and tensile strength at break than Comparative Example C6, a 1:3 ALPHALON 27C to POKETONE M330A including 15 wt % ROYALTUF 485. As indicated by the examples shown in Table 5, increased amounts of polyamide increase the flexural modulus, flexural strength, tensile modulus, and tensile strength of the polymer blend.

Example 3, a 3:1 ALPHALON 27C to POKETONE M330A polymer blend including 15 wt % ROYALTUF 485, has a relatively high Notched Izod Impact strength of 1259 J/m. Example 3 has similar flexural modulus, flexural strength, tensile strength at break, and tensile strength at yield as Comparative Examples C7 and C8, 1:0 ALPHALON 27C to POKETONE M330A polymer blends including 20 wt % ROYALTUF 485. As indicated in Table 5, a polyamide and aliphatic polyketone blend may achieve significantly increased Notched Izod Impact strength while maintaining similar flexural modulus, flexural strength, and tensile strength as a polyamide polymer blend without aliphatic polyketone.

Table 6 shows the formulations (in wt %) and certain properties of Comparative Examples C9-C11 and Examples 4 and 5.

TABLE 6

| Example | 4 | 5 | C9 | C10 | C11 |
|---|---|---|---|---|---|
| ALPHALON 27 C | 84.15 | 74.206 | 69.21 | 59.325 | 39.55 |
| POKETONE M330A | 4.95 | 9.894 | 9.89 | 19.775 | 39.55 |
| ROYALTUF 485 | 10 | 15 | 20 | 20 | 20 |
| EPSOLUTE C13-09 | 0.5 | 0.5 | 0.5 | 0.5 | 0.5 |
| IRGAFOS 168 | 0.15 | 0.15 | 0.15 | 0.15 | 0.15 |
| IRGANOX 1098 | 0.25 | 0.25 | 0.25 | 0.25 | 0.25 |
| Notched Izod Impact strength (J/m) | 1100 | 1164 | 1212 | 1169 | 1153 |
| Type of notched break | partial | Partial | partial | partial | Partial |
| Heat deflection temp. (° C.) | 151 | 109 | 67 | 99 | 98 |
| Flexural modulus (MPa) | 1556 | 1367 | 1234 | 1062 | 1255 |
| Flexural strength (MPa) | 67 | 58 | 52 | 47 | 48 |
| Tensile modulus (MPa) | 2049 | 1825 | 1593 | 1436 | 1398 |
| Tensile strength at yield (MPa) | 65 | 61 | 57 | 56 | 60 |
| Tensile elongation at yield (%) | 4.2 | 10 | 10 | 10 | 28 |
| Tensile strength at break (MPa) | 62 | 55 | 53 | 56 | 59 |
| Tensile elongation at break (%) | 153 | 150 | 166 | 193 | 211 |
| Melt flow rate (g/10 min) (250° C./5 kg) | 1.2 | 0.9 | 0.8 | 0.5 | 8.8 |
| Specific gravity | 1.11 | 1.10 | 1.09 | 1.09 | 1.12 |

Referring now to FIGS. 1 and 2, with polyamide and aliphatic polyketone blends, high Notched Izod Impact strength coincides with the lowest heat deflection temperatures. Exceptions to this general trend are Examples 4 and 5, where relatively low amounts of POKETONE M330A and ROYALTUF 485 are added. Example 4 has a heat deflection temperature of 151° C. and still achieves a high Notched Izod Impact of 1100 J/m. Example 5 has a heat deflection temperature of 109° C. and still achieves a high Notched Izod Impact strength of 1164 J/m. Moreover, Examples 4 and 5 have higher flexural modulus, flexural strength, tensile modulus, and tensile strength at yield than Comparative Examples C9-C11.

Table 7 shows the formulations (in wt %) and certain properties of Comparative Examples C12-C15 and Examples 6 and 7.

TABLE 7

| Example | 6 | 7 | C12 | C13 | C14 | C15 |
|---|---|---|---|---|---|---|
| Ratio of ALPHALON 27C to POKETONE M330A | 17:1 | 19:1 | 1:0 | 1:0 | 1:0 | 1:0 |
| ALPHALON 27C | 84.15 | 85.3575 | 89.1 | 89.1 | 79.1 | 79.1 |
| POKETONE M330A | 4.95 | 4.4925 | 0 | 0 | 0 | 0 |
| ROYALTUF 485 | 10 | 10 | 10 | 10 | 20 | 20 |
| EPSOLUTE C13-09 | 0.5 | 0 | 0.5 | 0.15 | 0.15 | 0.5 |
| IRGAFOS 168 | 0.15 | 0.05 | 0.15 | 0.25 | 0.25 | 0.15 |
| IRGANOX 1098 | 0.25 | 0.1 | 0.25 | 0.5 | 0.5 | 0.25 |
| Notched Izod Impact strength (J/m) | 1100 | 1202 | 162 | 162 | 706 | 744 |
| Type of notched break | partial | partial | complete | complete | partial | complete |
| Heat deflection temp. (° C.) | 151 | 167 | 142 | 144 | 160 | 133 |
| Flexural modulus (MPa) | 1556 | 2392 | 2026 | 2079 | 1639 | 1667 |
| Flexural strength (MPa) | 67 | 91 | 127 | 129 | 110 | 111 |
| Tensile modulus (MPa) | 2049 | 1878 | 2211 | 2329 | 1922 | 1886 |
| Tensile strength at yield (MPa) | 65 | 71 | 54 | 54 | 44 | 43 |
| Tensile elongation at yield (%) | 4.2 | — | 3.8 | 4.7 | 7.5 | 4.9 |
| Tensile strength at break (MPa) | 62 | 69 | 39 | 39 | 34 | 33 |
| Tensile elongation at break (%) | 153 | 167 | 19 | 14 | 60 | 28 |
| Melt flow rate (g/10 min) (250° C./5 kg) | 1.2 | — | 36 | 41 | 32 | 24 |
| Specific gravity | 1.11 | 1.10 | 1.10 | 1.11 | 1.08 | 1.11 |

Examples 6 and 7, 17:1 and 19:1 ALPHALON 27C to POKETONE M330A polymer blends, respectively, including 10 wt % ROYALTUF 485, have significantly improved Notched Izod Impact strength of 1100 J/m and 1202 J/m, respectively, when compared to Comparative Examples C12-C15, formulations of 1:0 ALPHALON 27C to POKETONE M330A. Examples 6 and 7 maintain a heat deflection temperature of 151° C. and 167° C., respectively. While Examples 6 and 7 have lower flexural strength than Comparative Examples C12-C15, Examples 6 and 7 have similar or improved tensile modulus and tensile strength as compared to Comparative Examples C12-C15. As in Example 4 of Table 6, Examples 6 and 7 indicate that adding relatively low amounts of aliphatic polyketone (e.g., 4 to 5 wt %) results in polymer blends having heat deflection temperature values of about 140-160° C. and achieving high Notched Izod Impact strength of greater than 800 J/m. Moreover, the polyamide and aliphatic polyketone blends of Examples 6 and 7 have similar or improved tensile modulus and tensile strength when compared to the polyamide only blends of Comparative Examples C12-C15. Accordingly, Examples 6 and 7 show that polymer blends with a polyamide and a relatively low amount of aliphatic polyketone have high Notched Izod Impact strength, high heat deflection temperature, and similar tensile modulus and tensile strength as polyamide only blends.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

What is claimed is:

1. A polymer blend comprising, based on total weight of the polymer blend:

greater than or equal to 30 wt % and less than or equal to 88 wt % of a polyamide;

greater than or equal to 4 wt % and less than or equal to 50 wt % of an aliphatic polyketone;

greater than or equal to 7.5 wt % and less than or equal to 20 wt % of a rubber impact modifier; and greater than 0 wt % and less than or equal to 1 wt % of a hydroxyapatite stabilizer.

2. The polymer blend of claim 1, wherein the hydroxyapatite stabilizer comprises pentacalcium hydroxide tris (orthophosphate) amorphous tricalcium hydroxyphosphate, calcium phosphate hydroxide, or a combination thereof.

3. The polymer blend of claim 1, wherein the polymer blend comprises greater than or equal to 55 wt % and less than or equal to 87.5 wt % of the polyamide.

4. The polymer blend of claim 3, wherein the polyamide comprises poly(propiolactam), poly(caprolactam), polycapryllactam, poly(decano-10-lactam), poly(undecano-11-lactam), poly(dodecano-12-lactam), poly(tetramethylene adipamide), poly(hexamethylene adipamide), poly(hexamethylene azelamide), poly(hexamethylene sebacamide), poly(hexamethylene dodecanediamide), poly(decamethylene sebacamide), or a combination thereof.

5. The polymer blend of claim 1, wherein the polymer blend comprises greater than or equal to 4.5 wt % and less than or equal to 35 wt % of the aliphatic polyketone.

6. The polymer blend of claim 5, wherein the polymer blend comprises greater than or equal to 5 wt % and less than or equal to 25 wt % of the aliphatic polyketone.

7. The polymer blend of claim 1, wherein the polymer blend comprises greater than or equal to 10 wt % and less than or equal to 20 wt % of the rubber impact modifier.

8. The polymer blend of claim 7, wherein the rubber impact modifier comprises a styrene-ethylene/butylene-styrene block copolymer (SEBS), a styrene isoprene block copolymer (SIS), an ethylene propylene diene monomer (EPDM), anhydride grafted analogues thereof, or a combination thereof.

9. The polymer blend of claim 1, wherein the rubber impact modifier comprises a styrene-ethylene/butylene-styrene block copolymer (SEBS), a styrene isoprene block copolymer (SIS), an ethylene propylene diene monomer (EPDM), anhydride grafted analogues thereof, or a combination thereof.

10. The polymer blend of claim 9, wherein the rubber impact modifier comprises maleic anhydride grafted SEBS, maleic anhydride grafted EPDM, or a combination thereof.

11. The polymer blend of claim 1, wherein the polyamide comprises poly(propiolactam), poly(caprolactam), polycapryllactam, poly(decano-10-lactam), poly(undecano-11-lactam), poly(dodecano-12-lactam), poly(tetramethylene adipamide), poly(hexamethylene adipamide), poly(hexamethylene azelamide), poly(hexamethylene sebacamide), poly(hexamethylene dodecanediamide), poly(decamethylene sebacamide), or a combination thereof.

12. The polymer blend of claim 1, wherein the polymer blend has a Notched Izod Impact strength greater than or equal to 800 J/m.

13. The polymer blend of claim 1, wherein the polymer blend has a heat deflection temperature greater than or equal to 100° C.

14. The polymer blend of claim 13, wherein the polymer blend has a heat deflection temperature greater than or equal to 130° C.

15. The polymer blend of claim 1, wherein the polymer blend further comprises greater than 0 wt % and less than or equal to 1 wt % of a filler.

16. The polymer blend of claim 15, wherein the filler comprises adhesion promoters; biocides; anti-fogging agents; anti-static agents; blowing agents; foaming agents; bonding agents; bonding polymers; dispersants; flame retardants; smoke suppressants; initiators; lubricants; micas; pigments; colorants; dyes; processing aids; release agents; silanes; titanates; zirconates; slip agents; anti-blocking agents; stearates; ultraviolet light absorbers; viscosity regulators; waxes; or a combination thereof.

17. The polymer blend of claim 16, wherein the rubber impact modifier comprises maleic anhydride grafted SEBS, maleic anhydride grafted EPDM, or a combination thereof.

18. The polymer blend of claim 1, wherein the polymer blend has a Notched Izod Impact strength greater than or equal to 800 J/m; and wherein the polymer blend has a heat deflection temperature greater than or equal to 100° C.

19. The polymer blend of claim 1, wherein the polymer blend comprises greater than or equal to 55 wt % and less than or equal to 87.5 wt % of the polyamide; greater than or equal to 4.5 wt % and less than or equal to 35 wt % of the aliphatic polyketone; and greater than or equal to 10 wt % and less than or equal to 20 wt % of the rubber impact modifier.

* * * * *